US008583642B2

(12) United States Patent
Gupta et al.

(10) Patent No.: US 8,583,642 B2
(45) Date of Patent: Nov. 12, 2013

(54) AGGREGATED SUBSCRIBER PROFILE BASED ON STATIC AND DYNAMIC INFORMATION

(75) Inventors: Amit Gupta, Redmond, WA (US); Ginger Tien, Bellevue, WA (US); Marcelo D. Truffat, Woodinville, WA (US); Thomas McNeill, Sammamish, WA (US); Li Qing Xia, Seattle, WA (US); Eran Shtiegman, Redmond, WA (US); Kelly Rollin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 12/351,532

(22) Filed: Jan. 9, 2009

(65) Prior Publication Data

US 2010/0185677 A1 Jul. 22, 2010

(51) Int. Cl.
*G06F 17/30* (2006.01)
(52) U.S. Cl.
USPC .......................................................... 707/736
(58) Field of Classification Search
USPC ........................................ 455/418; 379/88.12
See application file for complete search history.

(56) References Cited

U.S. PATENT DOCUMENTS

| 6,731,314 B1 | 5/2004 | Cheng et al. |
| 7,433,920 B2 | 10/2008 | Blagsvedt et al. |
| 7,751,533 B2 * | 7/2010 | Makela ...................... 379/88.12 |
| 2002/0111172 A1 * | 8/2002 | DeWolf et al. ................ 455/456 |
| 2004/0122895 A1 * | 6/2004 | Gourraud ...................... 709/204 |
| 2005/0245247 A1 * | 11/2005 | Seo et al. ...................... 455/418 |
| 2007/0156805 A1 | 7/2007 | Bristol et al. |
| 2007/0266156 A1 * | 11/2007 | Wilkins ........................ 709/225 |
| 2008/0133580 A1 | 6/2008 | Wanless et al. |
| 2008/0208973 A1 | 8/2008 | Hayashi et al. |
| 2008/0256170 A1 | 10/2008 | Hayashi et al. |
| 2009/0240568 A1 * | 9/2009 | Ramer et al. .................... 705/10 |
| 2009/0265794 A1 * | 10/2009 | Apelqvist ....................... 726/30 |

OTHER PUBLICATIONS

"Microsoft Office Live Communications Server 2005 with Service Pack 1 Feature Guide" retrieved at << https://a248.e.akamai.net/f/248/3214/1d/www.zones.com/images/pdf/ms_live_communications_server_guide.pdf >>, Version 2.2, Apr. 2005,pp. 22.
"Microsoft Office Communications Server" retrieved at << http://www.microsoft.com/communicationsserver/en/us/capabilities.aspx >>, Dec. 8, 2008, pp. 7.
"Office Communications Server Enterprise External Connector" retrieved at << http://www.softguide.com/pp/1783/office-communications-server-enterprise-external-connector.htm >> Dec. 8, 2008, pp. 6.

* cited by examiner

*Primary Examiner* — Jorge A Casanova
(74) *Attorney, Agent, or Firm* — Turk IP Law, LLC (57) ABSTRACT

Static user information such as address, title, phone number(s), email address(es) and dynamic user information such as location, calendar, current phone number(s), etc. are combined in a dynamically updateable subscriber contact card for publishing to other applications. The subscriber contact card also includes user defined access controls for restricting access to portions of the information by select users. Other applications provide services such as communication services based on up-to-date information through the subscriber contact card.

18 Claims, 9 Drawing Sheets

AGGREGATED SUBSCRIBER PROFILE BASED ON STATIC AND DYNAMIC INFORMATION

BACKGROUND

The proliferation of capabilities and services provided through communication devices by newer systems combine a variety of short range and long range communication capabilities over a number of networks including traditional phone networks, wireless networks, and similar ones. Telecommunication end devices as well as support devices and programs for such newer systems are more similar to computer networks than conventional telephone networks. Thus, a large number of capabilities may be added to those already provided by modern telecommunication devices and networks. For example, instant messaging, voice/video communications, and other forms of communication may be combined with presence and availability information of subscribers.

In conventional systems, a static set of information for a subscriber's is maintained such as their address, phone number, email address, and similar information. Subscribers' contact cards also reflect that static information. This is because contact information (especially in a system supporting large number of subscribers) can be difficult to change and time consuming to update. Administration support is often required to make changes to information. As a result, contact information may become out of date. In addition, subscribers do not have an easy way to control access to their information, and so must conform to the standards set by the system administrators for their contacts, search the system directory, initiate and receive communication to and from contacts.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to combining static directory information and dynamic actionable information associated with a subscriber for publishing to other subscribers. The aggregated information may be published in form of a contact card, which may further define access control rules defined by the subscriber. Through parameterized aggregation of the information, the contact card may be employed for consistent representation of contact information across multiple applications.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a subscriber contact card aggregating static and dynamic actionable information about the subscriber may be used to publish the information, as well as subscriber defined access controls, to applications over communication networks. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for aggregated subscriber profiles. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
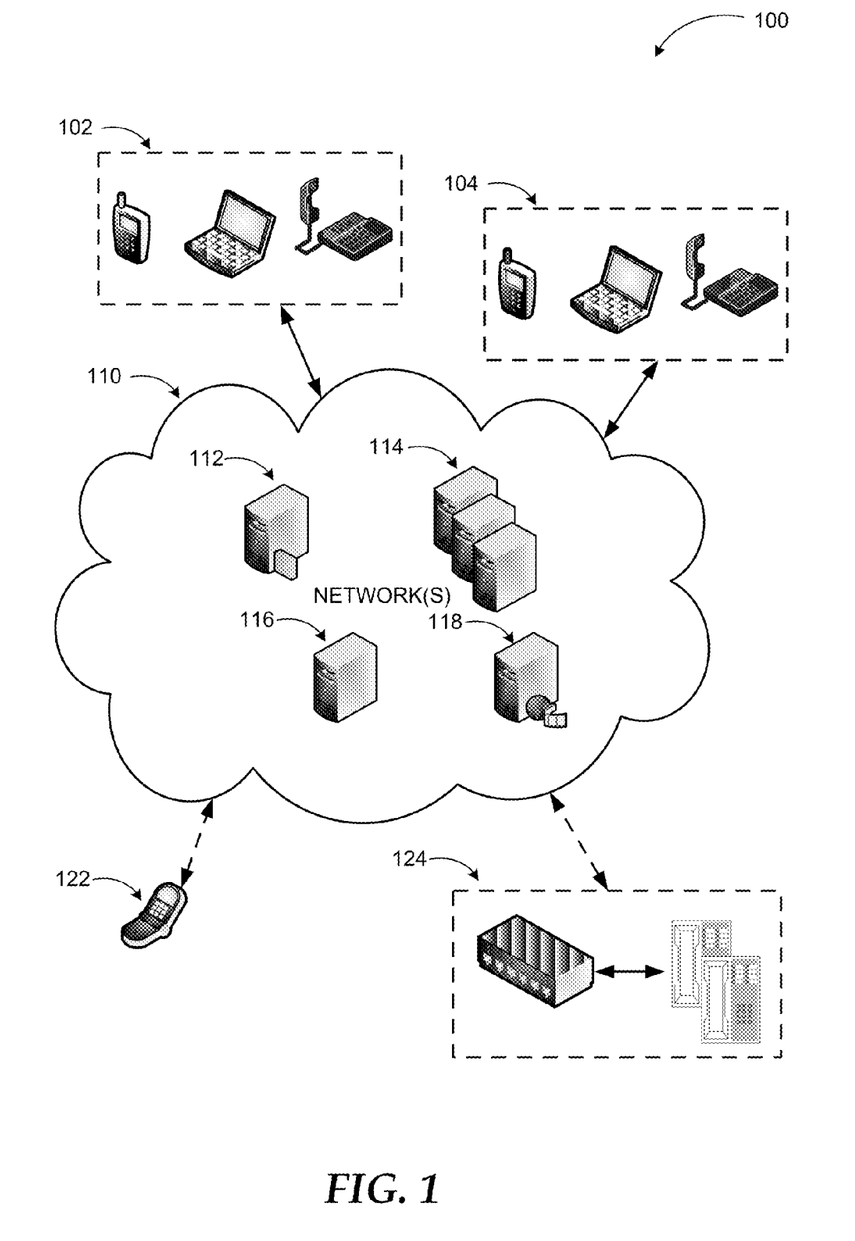
FIG. 1 is a diagram illustrating an example unified communications system, where embodiments may be implemented for exchange of subscriber information.

Referring to FIG. 1, diagram 100 of an example unified communications system, where embodiments may be practiced, is illustrated. A unified communication system is an example of modern communication systems with a wide range of capabilities and services that can be provided to subscribers. A unified communication system is a real-time communications system facilitating instant messaging, presence, audio-video conferencing, and web conferencing functionality.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent (e.g. Back-to-Back User Agent "B2BUA").

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

One of the servers described above or a separate server may be responsible for combining static and dynamic data such as presence data associated with subscribers. Presence information may include a wide range of data associated with each subscriber such as their location, availability, contact information details, alternative contacts, organizational information, and comparable data. Other data such as calendar information associated with a subscriber may also be combined with static data in a subscriber contact card for providing to other applications. According to further embodiments, dynamic and static data may be combined on the client applications as well.

While the example system in FIG. 1 has been described with specific components such as mediation server, A/V server, and similar devices, embodiments are not limited to these components or system configurations and can be implemented with other system configuration employing fewer or additional components. Functionality of systems aggregating static and dynamic subscriber information may also be distributed among the components of the systems differently depending on component capabilities and system configurations.

Figure 2:
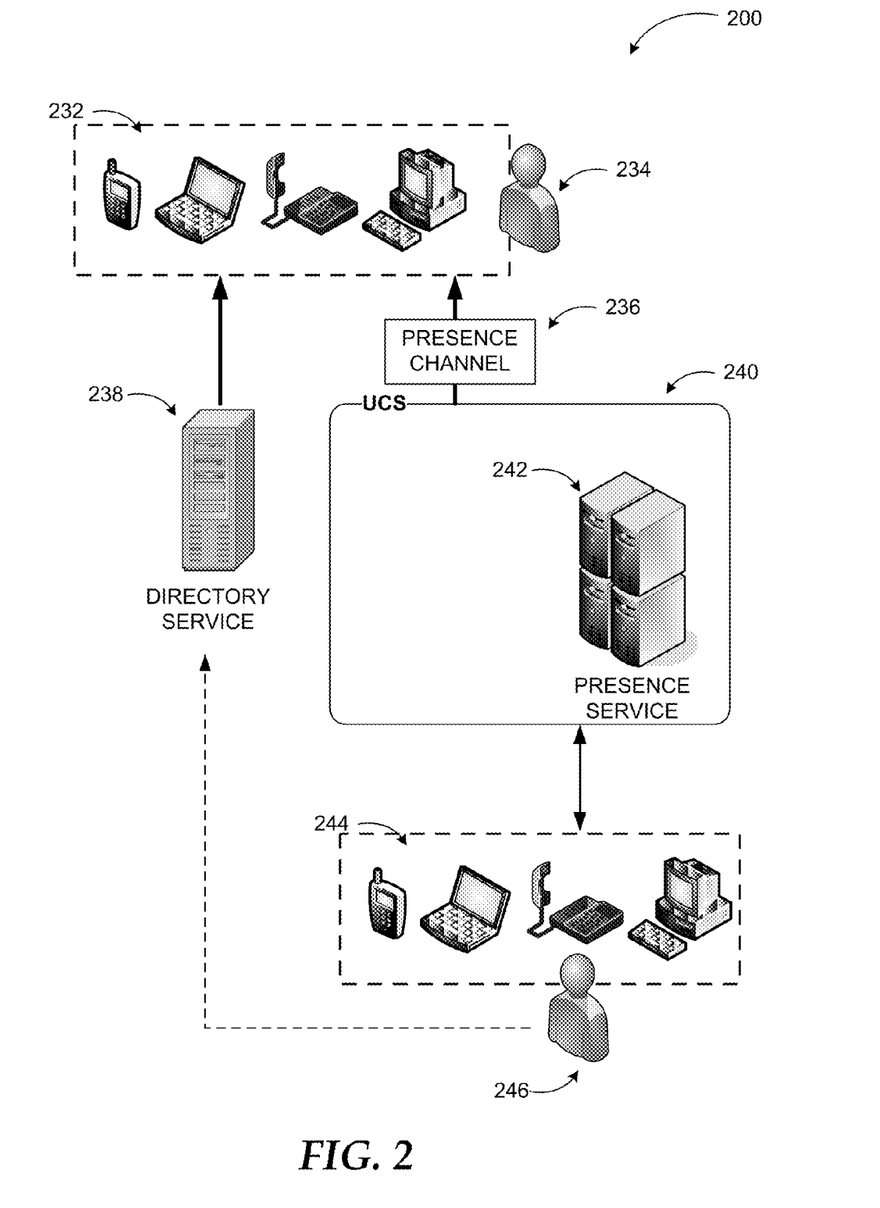
FIG. 2 illustrates an example system where static and dynamic subscriber information may be aggregated according to some embodiments.

FIG. 2 illustrates an example system 200, where static and dynamic subscriber information may be aggregated according to some embodiments. While a system according to embodiments is likely to include many—if not all—of the components of a UC system discussed in FIG. 1 and additional ones, only those relevant to embodiments are shown in FIG. 2.

As mentioned previously, users may utilize a variety of communication devices (e.g. 232, 244) with different capabilities in a UC system. The enhanced services provided by such devices (and applications) complementing voice/video/textual communications necessitate and utilize additional information associated with each user (e.g. 234, 246). For example, a user's contact information may include his/her location, organizational status, alternative contacts, and similar information, which may be used by a another user to determine which communication mode to choose for a particular call, a timing of the call, or even an alternative contact to call.

In conventional systems, information is saved, retrieved, and displayed on communication applications based on static directory service (238) data. Active Directory® is an example directory service that enables administrators to assign policies, deploy software, and apply critical updates to an organization. Active Directory stores information and settings in a central database. An Active Directory structure is a hierarchical framework of objects. One of the object categories includes users (user accounts and groups). The Active Directory provides information on the objects, organizes the objects, controls access and sets security. Thus, in the user information context, an Active Directory service may store information such as title, office address, email address, organization, photo, and similar information about users and make those available based on organization wide access control and security rules.

On the other hand, at least a portion of user associated information in a unified communication (240) or similar system is dynamic. Location, current phone number, calendar information, and similar information (presence) associated with a user is managed by presence service 242 and may be modified frequently by the user or by other components of the system (automatic updates to calendar, location information, and so on).

According to some embodiments, static directory service data and dynamic (live) presence information may be combined to keep contact information up-to-date and users enabled to control over who can access specific pieces of information. Users may also be enabled to change their own live presence document information in an instant, without having to go through a directory service update. Thus, user 246 may have static information managed by directory service 238 and dynamic information managed by presence service 242. The two categories of information may be combined in a user contact card (the presence information being provided through a presence channel 236) such that the information (associated with user 246) is updated across all applications in which the contact card is utilized. Furthermore, since the information is live and up-to-date, the value of the contact card may be greatly enhanced by, for example, enabling users to call a user from the contact card in one click. The update to the contact card may also be sent to federated users, with the assurance that information is not stale. In case of federated users, the updated contact card may just contain dynamic information that comes from the presence channel since there may not be any source for static information. The updating process still follows the access rules and displays the dynamic actionable data as explained herein.

In some cases a subscriber may also have a local data store like a personal contacts lists maintained by an electronic mail application, where he/she maintains the static pieces of information (such as a nick name) with the dynamic information coming from a presence service. A contact card according to embodiments may perform the aggregation involving the data in the local data store as well and provide the proper combination of static and dynamic information on the contact card based on business rules and other precedence logic for data.

Embodiments are not limited to unified communication systems. The approaches discussed here may be applied to any data exchange in a networked communication environment using the principles described herein. Furthermore, UC systems, as mentioned above, are provided as an example environment. Embodiments may be implemented in any networked communication environment such as a cellular data network.

Figure 3:
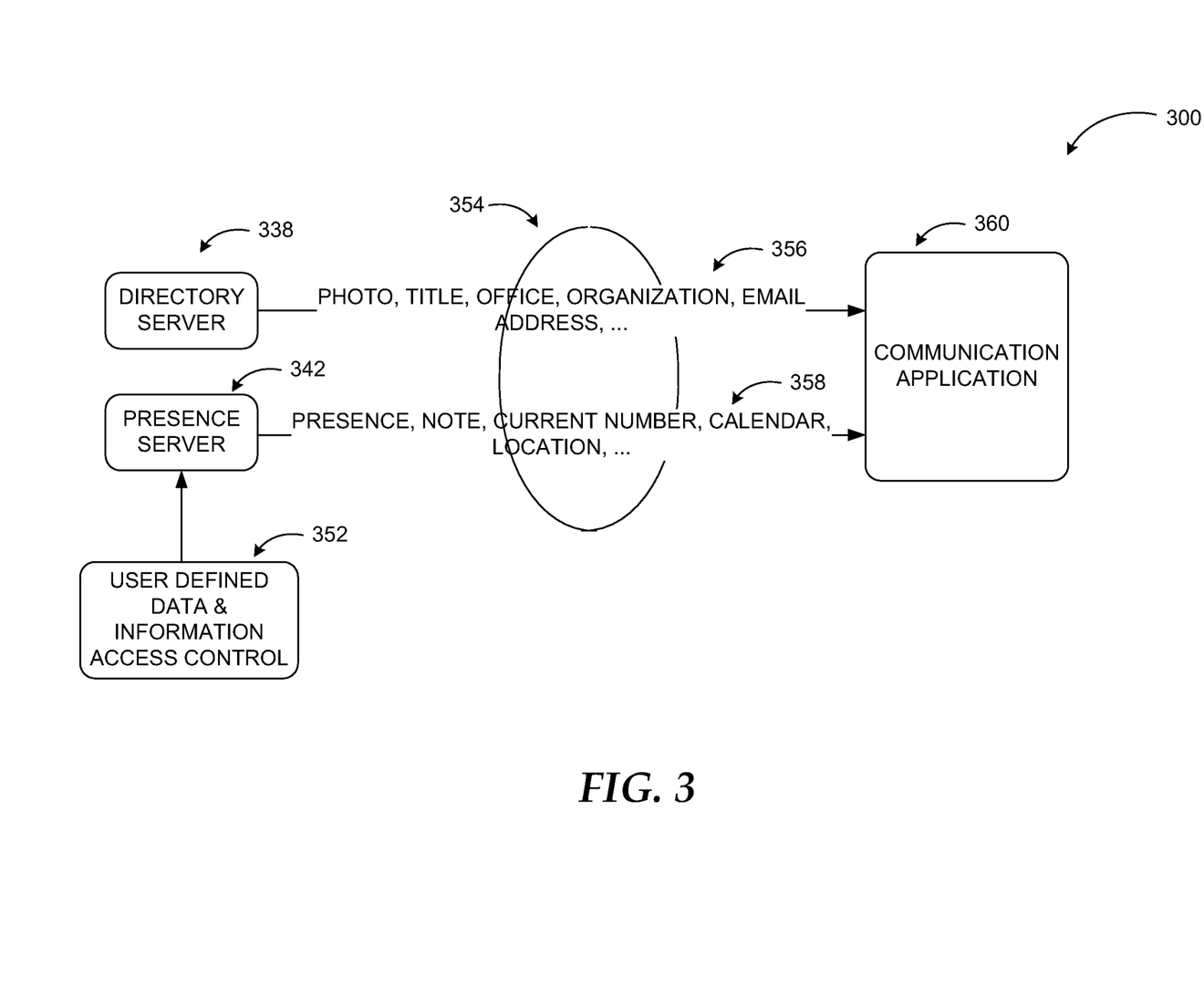
FIG. 3 is a conceptual diagram illustrating aggregation of static and dynamic information according to embodiments.

FIG. 3 includes conceptual diagram 300 illustrating aggregation of static and dynamic information according to embodiments. Static and dynamic information may be provided by a variety of sources and combined into a subscriber contact card for efficient updating of information across applications while giving users control over which portion of the information can be accessed by others. In diagram 300, a system similar to the unified communication system of FIG. 2 is shown as an example.

Directory server 338 manages typically static information 356 such as organizational information, title, office/home/email addresses, photo, and other similar data. These types of information do not change frequently and can be managed by an organizational service based on organization level rules (access, security, update, etc. rules). Differently from the above described static information, user data such as presence information, notes, current phone number(s), calendar information, location information, and comparable ones are dynamic and actionable (358). For example, calendar information may change frequently based on input from the user himself/herself or by others (invitations, appointments, etc.) and other users may call the user based on the user's calendar information, when that information is published through a live contact card to the other users.

Presence server 342 manages such dynamic presence information and publishes it to other users. According to some embodiments, users may be enabled to define access control rules for the live contact information. For example, a user may choose not to have their current number published to everyone, but only to their colleagues. Other examples of restricted access data may include calendar information (partial or all), location information, and so on. Thus, dynamic information subject to user defined access controls 352 provided by the presence server 342 and static information provided by directory server 338 are combined (354) into a live contact card that can be published to any application that may utilize the card for retrieving the user information and provide actions based on the retrieved information.

Each piece of data is retrieved from a certain hierarchy of a variety of possible sources such as a communication application, an instant messaging application, an electronic mail application, a calendaring/scheduling application, or even a word processing application. A registry key may allow the administrator to set a preference for either application. In electronic mail applications such as Microsoft Outlook® by MICROSOFT CORP. of Redmond, Wash., a choice may be made between Messaging Application Programming Interface (MAPI) and Active Directory. Data from a unified communication application is commonly dynamic (live) and the sharing of the data may be controlled by the user.

The combined information (354) is provided to communication application 360, which receives updates automatically through the subscriber contact card. Communication application 360 may utilize the information from the subscriber contact card through various user interfaces to provide services. According to some embodiments, communication application 360 may use the subscriber contact card directly displaying it with actionable information as discussed below in conjunction with FIG. 4.

Although involvement of precedence logic is implicitly defined by aggregation of static and dynamic information, it should be noted that there may be set of information in a static data store that may be overridden by a dynamic data source and vice-versa, in a system according to embodiments. Applicable rules for such scenarios may be configured by policies and registry settings defined by an administrator, for example.

Subscriber information combined in a subscriber contact card may be used by a number of applications such as communication applications, electronic mail applications, calendar applications, scheduling applications, word processing applications, spreadsheet applications, database applications, and comparable ones. The applications may be local applications or distributed services executed by a central server and accessed through a browser or similar application.

Figure 4:
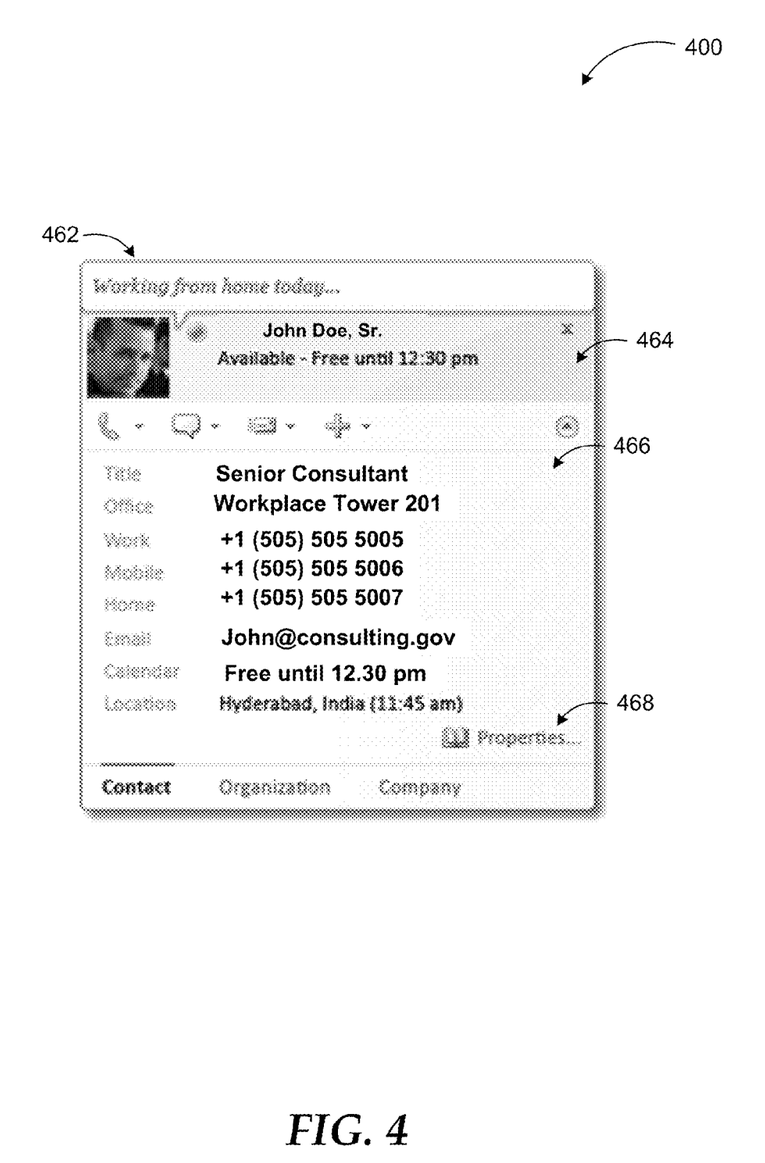
FIG. 4 is a screenshot of an example subscriber contact card displaying static and dynamic information.

FIG. 4 is a screenshot of an example subscriber contact card displaying static and dynamic information. As mentioned above, some applications may use the subscriber contact card combining dynamic and static information directly providing services based on the actionable information. Example subscriber contact card 400 is for user John Doe Sr. whose status (available until 12.30 pm) is shown (464) prominently at the upper portion of the card. Further status information (working from home today) 462 is shown at the top of the card. One action may be displaying the home address of John Doe Sr. upon clicking on the status indicator.

Section 466 of the subscriber contact card 400 includes static and dynamic information. Static information includes title, office address, email address. Dynamic information includes calendar and location. Both of those may be actionable, i.e. when a user clicks on calendar, they may see John Doe's calendar and when they click on the location, they may see a map of the current location or other relevant information (weather, office locations in the area, etc.).

The phone numbers may be static or dynamic. Static numbers are those assigned to John Doe Sr. and do not change frequently. On the other hand, the listed phone numbers may be dynamic and represent current numbers where John Doe Sr. may be reached, which may change frequently and updated by John Doe Sr. or by another source. Properties 468 icon may provide a link to further static information associated with the contact or actions for viewing and editing properties of the card such as view size, displayed information, and so on.

One of the common uses of contact cards is to share electronic business cards. Conventional applications enable sharing of an electronic business card for an email or calendaring applications, but those typically carry static information with one time copying capability. Using a contact card according to embodiments, users may share a live electronic business card by the virtue of sharing a unique identifier such as a SIP URI that pulls the information from the static and dynamic sources.

Figure 5:
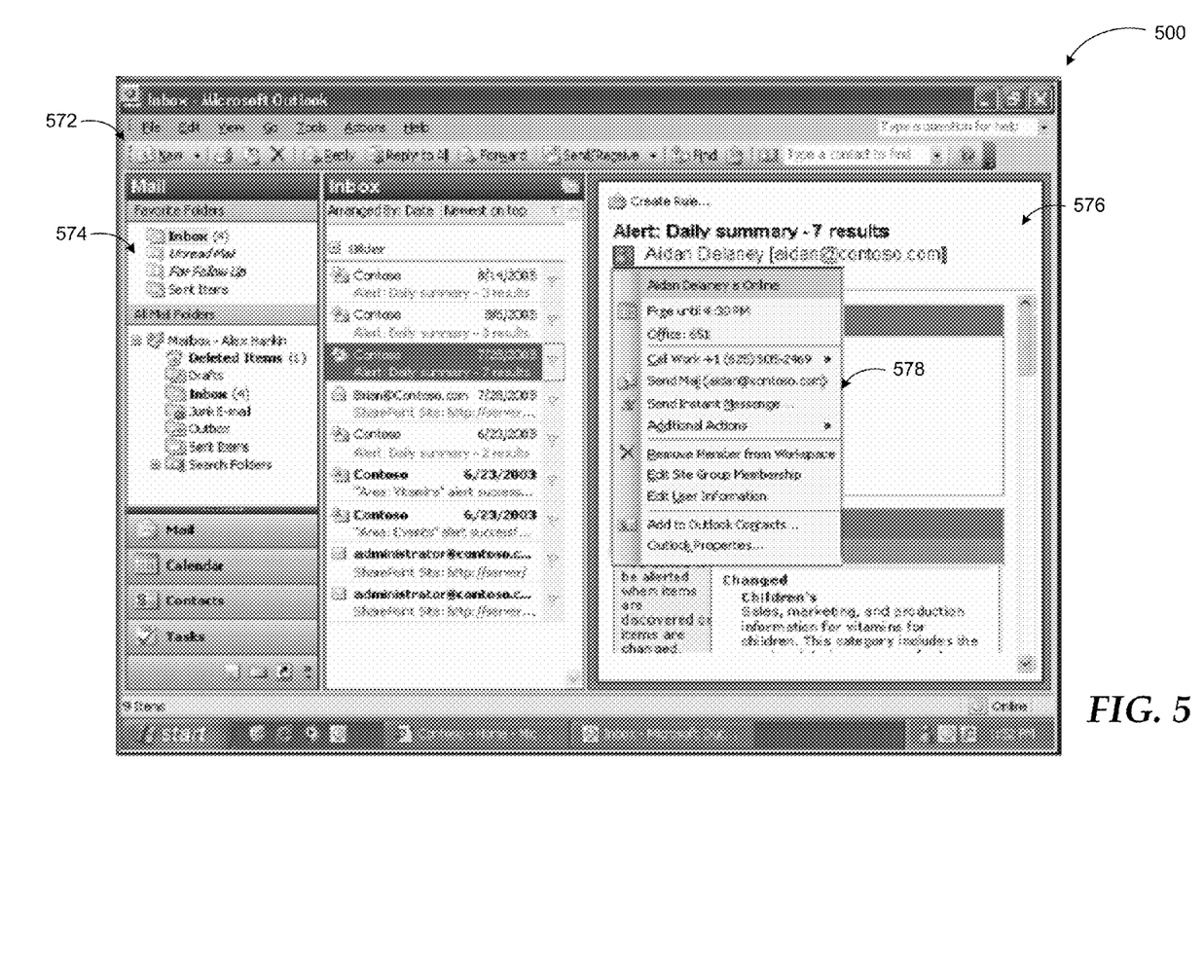
FIG. 5 is another screenshot of the user interface of an example application that may utilize aggregated subscriber information according to embodiments.

FIG. 5 is another screenshot of the user interface of an example application that may utilize aggregated subscriber information according to embodiments. User interface 500 is an example user interface of an electronic mail/calendar/address book application (Microsoft Outlook®).

User interface 500 includes control icons and menu links 572 as well as view areas for message, folders, and different functionalities (email, calendar, contacts, etc.) such as favorite folders 574. A selected item such as a message may be shown in more detail in view area 576. One of the conventional capabilities of an application like Microsoft Outlook® is the display of a user's (e.g. sender) email address, organization, etc. when the name or email address is clicked on in the relevant view area.

Through the use of a live subscriber contact card combining static and dynamic actionable information, capabilities of an application like Microsoft Outlook® may be enhanced and a pop-up menu 578 of action items may be provided upon selection of the user name on the application user interface.

Action items such as those provided on pop-up menu 578 may be customized based on a type of application. For example, a word processing application may be used to generate an address book. Detecting the format of the template the menu may include the address(es) associated with a user for adding to the address book. In a multi-functional application such as Microsoft Outlook®, various communication modes and possible functions may be made available through the pop-up menu. Of course embodiments are not limited to the example applications, user interfaces, and pop-up menus. Other user interfaces, and menus may be implemented to provide actionable links to users based on combined static and dynamic information associated with another user.

A similar implementation of extensibility according to embodiments includes maintaining the same look and feel of the contact card to display information across a family of applications and potentially other Line of Business (LOB) applications and adding extensibility for other applications by providing an additional pop-up menu alongside the contact card. For example, by right clicking the name in a document, a user may see a contact card with this additional pop-up menu.

Figure 6:
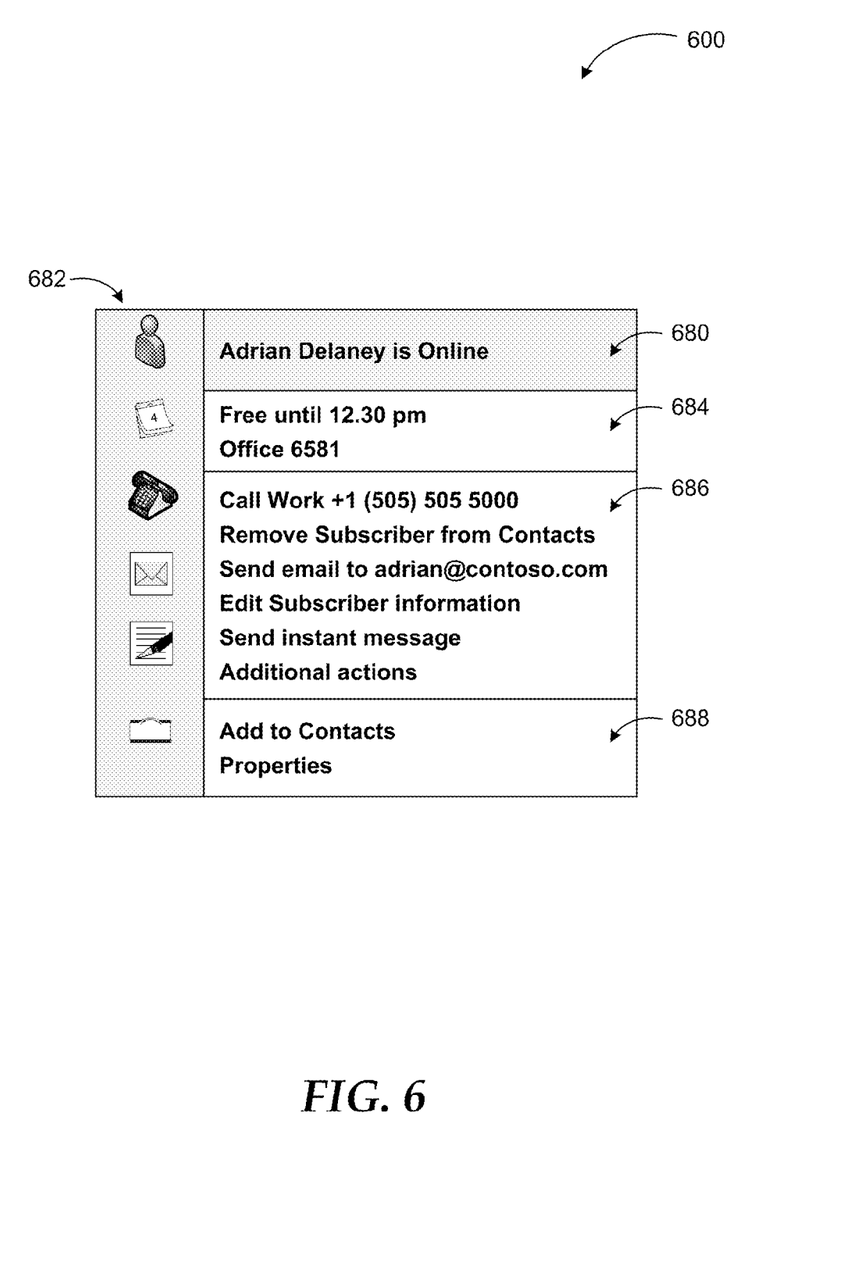
FIG. 6 is a screenshot of a portion of the example user interface of FIG. 5 illustrating use of aggregated subscriber information.

FIG. 6 is a screenshot of a portion of the example user interface of FIG. 5 illustrating use of aggregated subscriber information. Pop-up menu 600 displays various services textually and graphically, which may be performed based on the combined static and dynamic information received through a subscriber contact card.

Top section 680 displays a status of the user based on received presence information. Section 684 includes availability information and address for the user, both of which may be links providing further detailed information such as the user's calendar and a map of the address. Section 686 displays actions associated with the user such as initiating communication (voice call, email, instant message) with the user based on capabilities of the application displaying the information. Section 688 shows further actions such as the option to add the user to a contacts list. Section 682 provides graphical elements associated with the individual actions. The user whose information is the basis for the actions may be provided with the ability to define controls on who can access which part of the information. For example, the user's work number may be displayed to all other users, while his/her home number is displayed to supervisors and colleagues only.

The above discussed scenarios, example systems, cards, or applications are for illustration purposes. Embodiments are not restricted to those examples. Other forms of subscriber data, contact cards, and applications may be used in implementing aggregation of static and dynamic subscriber information in a similar manner using the principles described herein.

Figure 7:
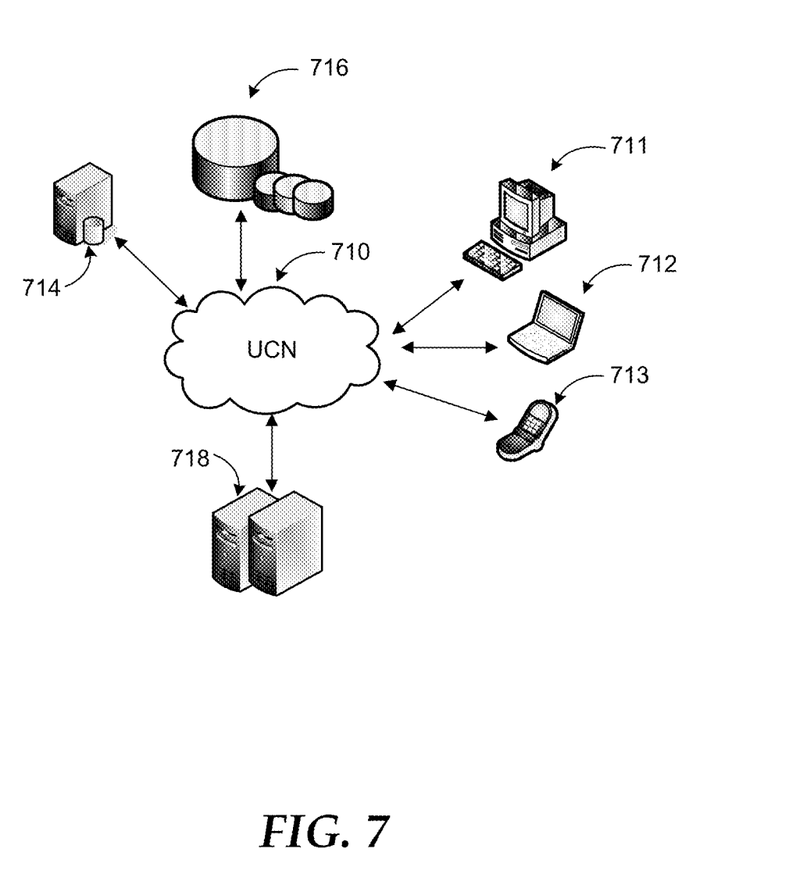
FIG. 7 is a networked environment, where a system according to embodiments may be implemented.

FIG. 7 is an example networked environment, where embodiments may be implemented. A platform providing unified communication services may be implemented via software executed over one or more servers 718 such as a hosted service. The platform may communicate with client applications on individual computing devices such as a cellular phone 713, a laptop computer 712, and desktop computer 711 (client devices) through network(s) 710.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services may be enabled in conjunction with the available communications. Furthermore, a variety of communication modes such as voice communication, video communication, instant messaging, electronic mail, data sharing, application sharing, white-boarding, and similar modes, may be available depending on the capabilities of each device and applications available on each device. Subscribers are also provided presence information including location, contact information, alternative contacts, availability status, calendar information, and similar data that may be used in determining whether or not to initiate communication with a subscriber, which mode of communication, and similar decisions.

As discussed previously, client devices 711-713 are used to facilitate communications through a variety of modes between subscribers of the UC service. Presence information and other data are provided to the client applications upon aggregation of the dynamic and static information in form of a subscriber contact card, which also enables user defined access control to portions of the subscriber information. Thus, static data from a directory server and dynamic data from a presence server (represented by servers 718), may be aggregated and forwarded to client applications being executed client devices 711-713. Information associated with subscribers and facilitating communications such as presence information may be stored in one or more data stores (e.g. data store 716), which may be managed by any one of the servers 718 or by database server 714.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks such as PSTN or cellular networks. Network(s) 710 provides communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a system for aggregating static and dynamic subscriber information. Furthermore, the networked environments discussed in FIG. 7 are for illustration purposes only. Embodiments are not limited to the example applications, modules, or processes.

Figure 8:
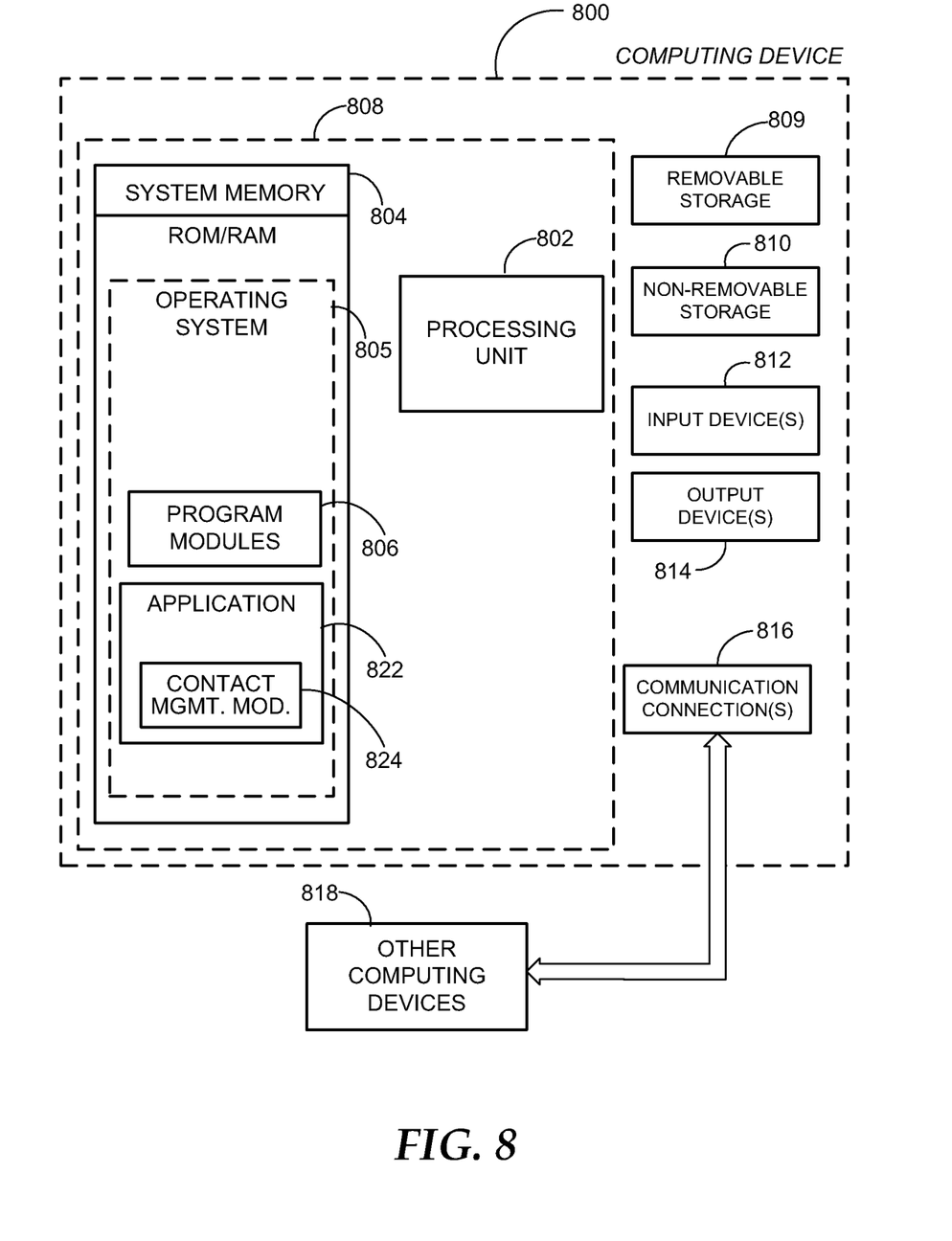
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be a presence server or another server for combining static and dynamic information and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, application 822, and contact management module 824.

Application 822 may be any application that can use or display a subscriber contact card combining static and dynamic information such as those listed previously. Contact management module 824 may receive the static information from a static information source such as a directory service, receive the dynamic information from a dynamic information source such as a presence server, and combine them in the live contact card that may be sent to other applications or federated users and kept up-to-date using federated data on presence channel. Information sharing can be controlled by each user by granting different access to each contact, including federated contacts. Contact management module 824 and application 822 may be separate applications or integral modules of a hosted service that provides enhanced communication services to client applications/devices. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications, other directory or presence servers, and comparable devices. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
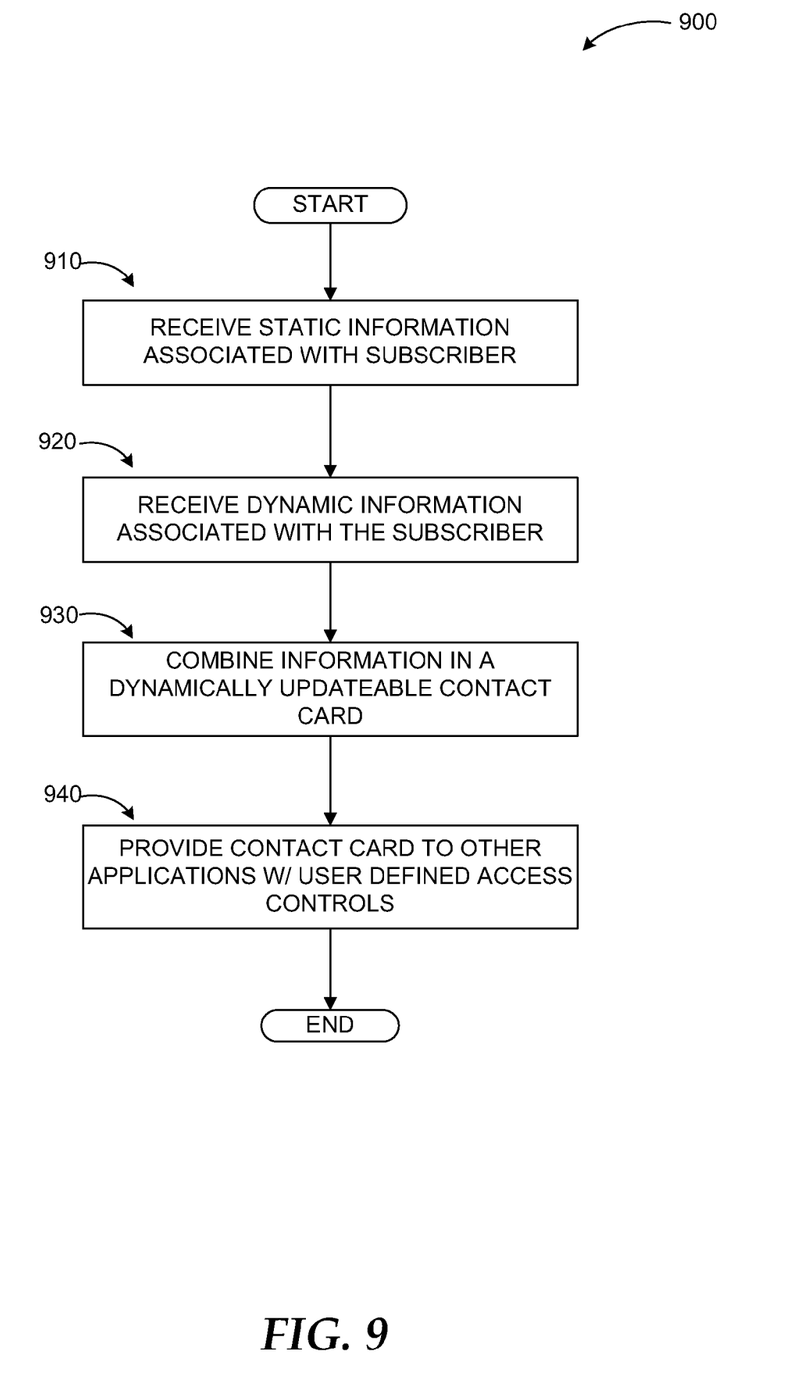
FIG. 9 illustrates a logic flow diagram for aggregating static and dynamic subscriber information according to embodiments.

FIG. 9 illustrates a logic flow diagram 900 for aggregating static and dynamic subscriber information according to embodiments. Process 900 may be implemented as part of an enhanced communication system that includes exchange of dynamic exchangeable information about subscribers.

Process 900 begins with operation 910, where static information associated with a subscriber is received from a static information source such as a directory service that manages the data. At operation 920, dynamic information associated with the same subscriber may be received from a dynamic information source such as a presence service. The dynamic information may be actionable. Furthermore, the dynamic information may include user defined rules for access to the information such as who can access which portion of the information.

At operation 930, the static and the dynamic information may be combined in a dynamically updateable subscriber contact card. The dynamic updateability means that any application using the subscriber contact card would receive updates to the dynamic information automatically being able to provide services based on up-to-date information. At operation 940, the subscriber contact card is provided to other users along with the user defined access controls such that only permitted information is used or displayed for users of other applications.

The operations included in process 900 are for illustration purposes. Aggregating static and dynamic subscriber information in form of a subscriber contact card may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing up-to-date subscriber information to one or more applications, the method comprising:
   receiving static information associated with a subscriber;
   receiving additional static information from a local data store including a personal contacts list of an electronic mail application and a hierarchy of source applications;
   receiving dynamic presence information associated with the subscriber from the hierarchy of source applications;
   selecting at least one of the source applications from the hierarchy to retrieve the additional static user and dynamic presence information according to a preference determined by a registry key setting;
   combining the static, additional static, and dynamic presence information in a dynamically updateable subscriber contact card at a subscriber information management server;
   providing the subscriber contact card to an application executed on another computing device such that the application is enabled to provide services based on up-to-date information associated with the subscriber;
   enabling activation of at least one application other than the application in conjunction with each dynamic presence information in the subscriber contact card; and
   sharing the subscriber contact card through a unique identifier including a session initiation protocol (SIP) uniform resource identifier (URI) to pull the static and dynamic information from the subscriber contact card.

2. The method of claim 1, further comprising:
   receiving at least one access control rule from the subscriber; and
   including the at least one access control rule in the subscriber contact card such that access to disseminated information associated with the subscriber is limited based on the at least one access control rule.

3. The method of claim 1, wherein the at least one access control rule is applicable to both the static information and the dynamic presence information.

4. The method of claim 1, wherein the dynamic presence information is actionable.

5. The method of claim 1, wherein the dynamic presence information includes at least one from a set of: location, current phone number, calendar information, alternative contacts, presence and availability information, idle time, remote time, capabilities, and notes associated with the subscriber.

6. The method of claim 1, wherein the static information includes at least one from a set of: a role, an address, an organization, an email address, a phone number, a name, a name pronunciation, a department, an office, a SIP address, and an image associated with the subscriber.

7. The method of claim 1, wherein the dynamic presence information is updated by at least one from a set of: the subscriber, an administrator, and another application.

8. The method of claim 1, wherein the subscriber contact card is displayable by other applications to provide services based on actionable links associated with a portion of the combined information.

9. The method of claim 8, wherein the subscriber contact card is configured to display a current availability status of the subscriber with an action link to displaying a relevant portion of a calendar of the subscriber.

10. The method of claim 8, wherein the subscriber contact card is further configured to display a current location of the subscriber with an action link to displaying a map associated with the current location of the subscriber.

11. A server in a unified communication (UC) system for providing up-to-date subscriber information to one or more applications, the server comprising:
   a memory for storing computer-executable instructions;
   a processor coupled to the memory, the processor configured to execute instructions to cause actions including:
      receive static information associated with a subscriber from a directory service;
      receive dynamic information associated with the subscriber from a presence server;
      receive additional static and dynamic user information from a hierarchy of source applications;
      select at least one of the source applications from the hierarchy to retrieve the additional static and dynamic information according to a preference determined by a registry key setting;
      receive access control rules from the subscriber;
      combine the static, dynamic, additional static, and additional dynamic information in a dynamically updateable subscriber profile by aggregating the static, dynamic, additional static, and additional dynamic information based on predefined business rules for the static and dynamic information;

include the access control rules in the subscriber profile such that access to combined information associated with the subscriber is limited based on the access control rules;

provide the subscriber profile to an application executed on another computing device associated with the UC system such that the application is enabled to provide services based on up-to-date information associated with the subscriber;

enable activation of at least one application other than the application in conjunction with each dynamic information in the subscriber profile; and provide customizable action items from the subscriber profile for a pop-up menu associated with the application according to a format of a menu template of the application.

12. The server of claim 11, wherein the processor is further configured to provide the dynamically updateable subscriber profile to federated users, and update at least a portion of the subscriber profile by sending federated data on a presence channel.

13. The server of claim 11, wherein the access control rules define an accessible portion of the combined information in the subscriber profile for each receiving user.

14. The server of claim 11, wherein the directory service is an Active Directory service.

15. The server of claim 11, wherein the application includes at least one from a set of: a communication application, an instant messaging application, an electronic mail application, a calendaring/scheduling application, a word processing application, a spreadsheet application, and a database application.

16. A computer-readable memory device with instructions stored thereon for providing up-to-date user information to one or more applications, the instructions comprising:

receiving static user information from a directory server;

receiving actionable dynamic presence information from a presence server;

receiving additional static user and dynamic presence information from a hierarchy of source applications;

selecting at least one of the source applications from the hierarchy to retrieve the additional static user and dynamic presence information according to a preference determined by a registry key setting;

adding local static user information to the additional static user information from a local data store including a personal contacts list of an electronic mail application;

receiving user updates to the dynamic presence information and access control rules for the dynamic presence information;

combining the static user information, the additional static user information, the additional dynamic presence information and the dynamic presence information as an aggregated user profile by aggregating the static user information, the additional static user information, the additional dynamic presence information and the dynamic presence information based on predefined business rules for the static user information and dynamic presence information;

sharing the aggregated user profile through a unique identifier including a session initiation protocol (SIP) uniform resource identifier (URI) to pull the static and dynamic information from the aggregated user profile;

forwarding the aggregated user profile to an application such that at least a portion of the aggregated user profile is displayed with the actionable links enabling activation of at least one application other than the application in conjunction with each dynamic information in the subscriber profile;

providing customizable actionable links from the aggregated user profile for a pop-up menu associated with the application according to a format of a menu template of the application; and enabling other users to call the user from one of the actionable links through a single action.

17. The computer-readable memory device of claim 16, wherein the aggregated user profile is employed by a communication application to determine a communication mode, a timing of communication, and an alternative contact for the user.

18. The computer-readable memory device of claim 16, wherein the aggregated user profile and updates to the profile are forwarded to the one or more applications such that a consistent dissemination of up-to-date user information across a plurality of applications and federated users is ensured.

* * * * *